O. KAMPFE.
TRAP FOR ANIMALS.
APPLICATION FILED AUG. 8, 1908.
924,237.
Patented June 8, 1909.
2 SHEETS—SHEET 1.
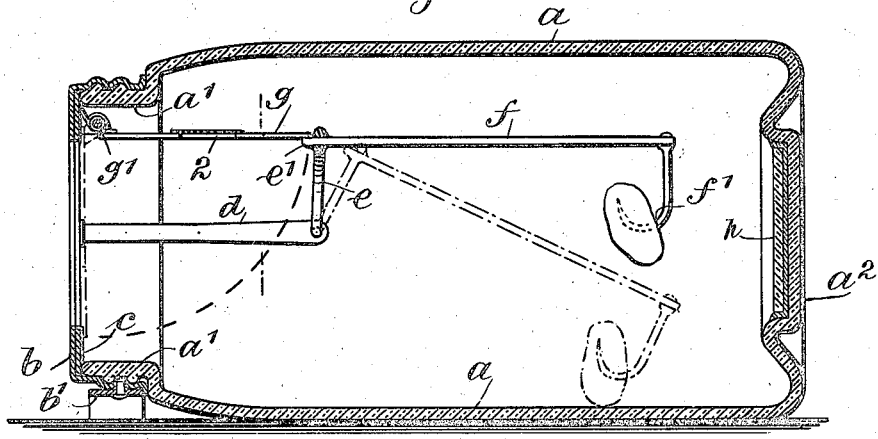
Fig. 1.
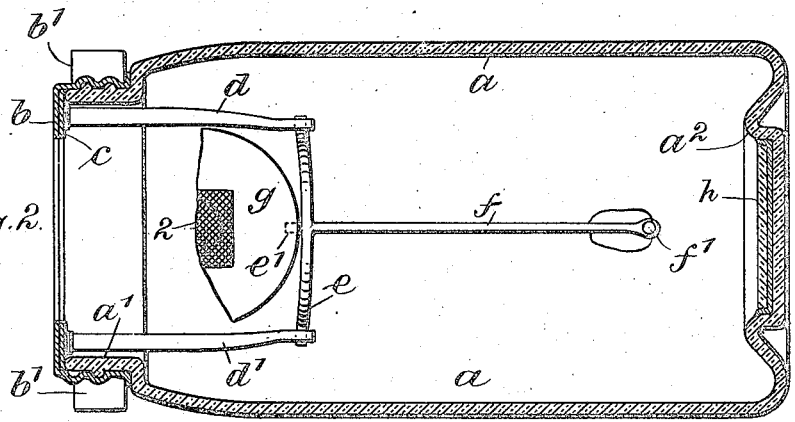
Fig. 2.
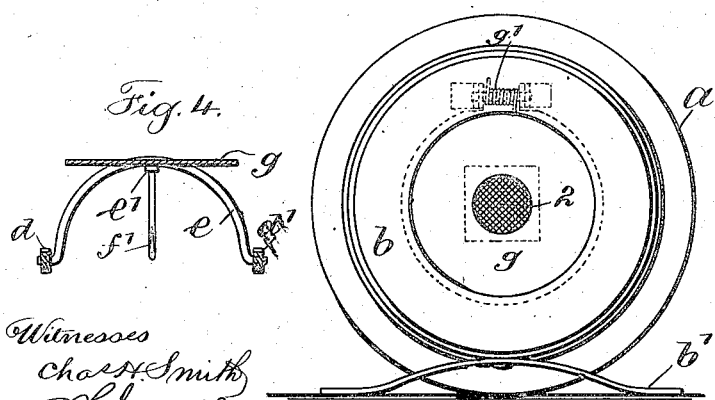
Fig. 4.
Fig. 3.
Witnesses
Chas. H. Smith
A. L. Serrell
Inventor
Otto Kampfe,
by Harold Serrell
his Atty O. KAMPFE.
TRAP FOR ANIMALS.
APPLICATION FILED AUG. 8, 1908.
924,237.
Patented June 8, 1909.
2 SHEETS—SHEET 2.
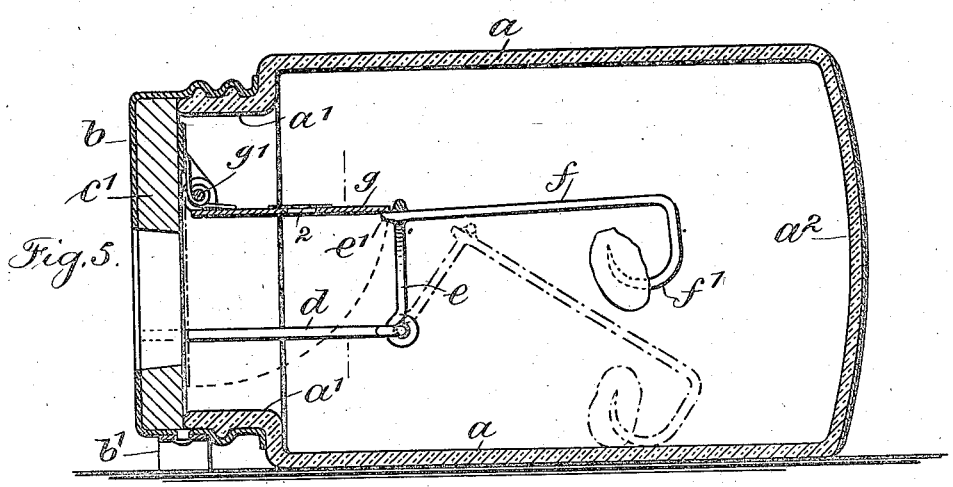
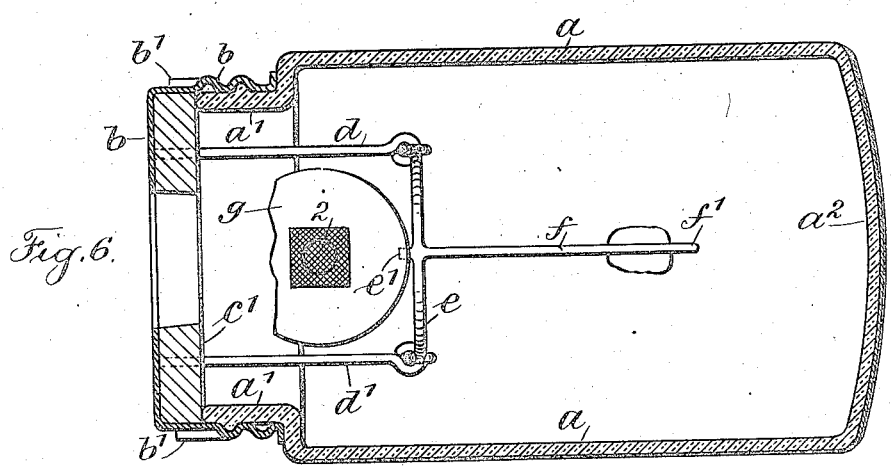
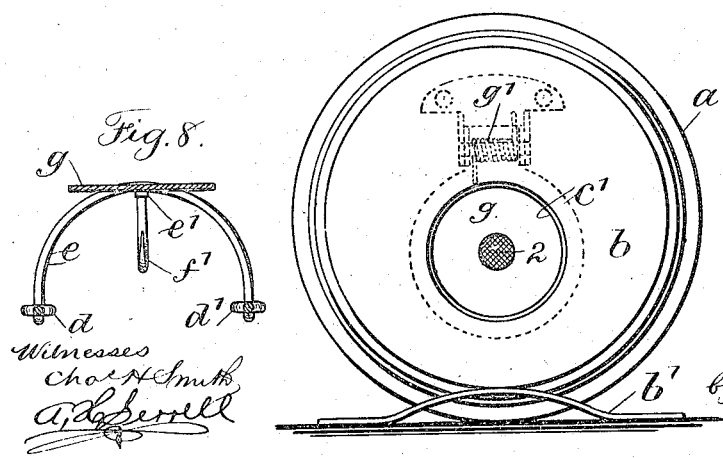
Witnesses
Chas H Smith
A. L. Serrell
Inventor
Otto Kampfe
by Harold Serrell
his att,

UNITED STATES PATENT OFFICE.

OTTO KAMPFE, OF NEW YORK, N. Y.

TRAP FOR ANIMALS.

No. 924,237.

Specification of Letters Patent.

Patented June 8, 1909.

Application filed August 8, 1908. Serial No. 447,502.

*To all whom it may concern:*

Be it known that I, OTTO KAMPFE, a citizen of the United States, residing in the borough of Brooklyn, county of Kings, city and State of New York, have invented an Improvement in Traps for Animals, of which the following is a specification.

My invention relates to a trap of peculiar form and construction for catching small animals such as *Rodentia Myomorpha*, and especially rats and mice of all kinds.

In connection with the form of traps heretofore employed for catching small animals such as rats and mice, many people object to the proximity of the animal when dead in the trap, also to being obliged to handle the animal to remove the same from the trap, and if a trap is wet, as would be necessary in drowning an animal therein, either the trap is injured by being wet or when dry becomes rusty and unsightly, and thereafter soils the hands in further use. There are also other and perhaps numerous objections to the well known forms of traps.

In carrying out my invention, I preferably employ a glass jar as the main portion of the trap and in connection with an apertured closing end or removable cover therefor, I employ two arms, an arched member and bait carrying bar pivoted to the arms. A pivoted spring actuated apertured closing disk is connected to the closing end or removable cover and this latter is held open projecting into the jar by being caught on a ledge of the arched member. I may employ a convex or flat bottom to the jar and silver the same so as to simulate a mirror, or arrange the bottom to receive a mirror, in which the animal surveying and about to enter the trap, sees itself in the reflecting surface and believing that another animal is also after the bait, hastens its determination to seize the bait, which act immediately springs the trap and releases the closing disk, which at once goes to its seat, closing the aperture in the end or cover and imprisoning the animal in the trap. An aperture made in this closing disk is filled with fine wire gauze permitting the entrance of air to the animal in the jar and the entrance of water either under a faucet or when the entire trap is immersed in a pail of water to drown the animal, the removable parts permitting the dead animal to be dropped out of the trap. The glass vessel is easily cleansed and the metal parts preferably being galvanized, do not become rusty or unsightly in use.

In the drawings, Figures 1 and 2 are longitudinal sections and partial elevations through the trap at right angles to one another. Fig. 3 is an elevation of the trap at the cover end and Fig. 4 is a section through the arms and disk and an elevation of the arched bar and bait bar. Figs. 5 and 6 are longitudinal sections at right angles to one another through a trap representing a form of my invention. Fig. 7 is an elevation at the cover end of the form shown in Figs. 5 and 6, and Fig. 8 is a section through the arms and disk, with the arch bar and pivot bar in elevation.

Similar letters of reference designate similar parts.

$a$ represents the body of the trap which constitutes the main portion. This is preferably a glass jar or vessel with a neck $a'$ screw threaded on the periphery or exterior.

As shown in Figs. 5 and 6, I may convex the bottom $a^2$ of the vessel and silver the same to simulate a mirror, but I prefer on account of the quality of the glass usually employed for these vessels to provide a recessed bottom as shown in Figs. 1 and 2, and therein to cement a circular mirror $h$.

$b$ represents the removable screw cover advantageously of metal and similar to the metal cover of a fruit jar. This cover is provided with a central aperture of any desired size and of ample size according to the size of the jar for the animal it is desired to catch to pass through.

$c$ represents an inner member of sheet metal soldered or otherwise secured to the inner surface of the screw cover and similarly apertured.

I prefer to employ a brace bar $b'$—see particularly Figs. 3 and 7,—which is bent and about centrally secured to the edge of the screw cover, said brace bar in use performing the function of preventing the trap turning or rolling.

$d\ d'$ are arms having end bearings; in Figs. 1 to 4 inclusive, these arms are secured to the metal member $c$ and their opposite ends are perforated as bearings for the trunnion ends of the arch bar $e$.

In Figs. 5—8 inclusive, $c'$ as a substitute for the parts $c$ in the other figures, is a block or body of appreciable thickness fitting within the removable screw cover $b$ and clamped by the same against the ends of the screw threaded neck $a'$ of the vessel and to this block or member $c'$, the arms $d\ d'$ are secured. These arms, according to Figs. 5—8 inclusive are wire with eye-ends and the arch bars of these latter figures are shown as provided with eyes interlocking with the eye-ends of the arms $d\ d'$, and while the structure in Figs. 5—8 inclusive is a modification or form of my invention over that shown in the other figures of the drawing, I do not limit myself to the precise form of any of these parts.

The arch bars $e$ are each provided with a shoulder $e'$ and with a bait bar $f$ having a hook end $f'$. The shoulder $e'$ is advantageously a prolongation of the bait bar $f$ on the opposite side of the arch bar and the hook end $f'$ may be a prolongation of the bait bar, as shown in Figs. 5—8 inclusive, or a separate piece as shown in Figs. 1 to 4 inclusive, but I do not limit myself in this respect.

$g$ represents an apertured disk connected by a spring hinge $g'$ to the inner surface of the metal member $c$,—Figs. 1 to 4 inclusive, or the block member $c'$ Figs. 5 to 8 inclusive, and in the aperture of this disk $g$ is secured a piece of wire gauze 2. I do not however limit my invention in this respect as a disk not apertured may be employed.

In the form of my invention shown in Figs. 1 and 2, the arms $d\ d'$ and spring actuated disk $g$ may be secured directly to the cover if the thickness of the metal employed therefor be made sufficient, but I do not limit my invention in regard to any of these minor particulars.

The full lines in Figs. 1 and 5 show the set up position of the trap, in which the disk $g$ is pushed into the vessel and its outer free edge passed above and resting upon the shoulder or ledge $e'$, and by virtue of the spring applied to this apertured disk $g$, the arch bar, bait bar and hook end and bait are held in position,—see full lines Figs. 1 and 5.

When the animal enters the trap and grasps the bait or nibbles at the same, this shifts the bait bar $f$ so that the disk $g$ becomes free from its support on the shoulder $e'$ and being spring actuated, it immediately goes to its seat against the inner surface of the members $c$ or $c'$, closing the trap and imprisoning the animal. It now remains to kill the animal caught; many people claim that the most humane and certainly the most sightly way is to drown the animal and this is accomplished by flooding the trap under the faucet or by immersing the entire trap with the animal caught therein, into a pail of water, in which case the water rushes through the wire gauze 2 in the apertured disk $g$, filling the same, and as the trap is submerged or filled with water under the faucet and there is no escape for the animal, it must drown. After its death is assured, the cover $b$ is unscrewed and the arms with the arch bar and bait bar and the disk $g$ removed from the jar and without touching the animal, the same may be then shaken out of the jar or will fall out by overturning the jar. The jar may then be readily cleansed with the metal parts hereinbefore described and the trap be reset to catch another rodent and repeat the operations.

The device is simple in construction, readily cleansed and kept clean; it is more permanent and lasting than a wooden trap, and more humane in its functions. If the base of the jar or vessel is formed with a mirror, as I prefer, the trap is more effective in its operation.

I claim as my invention:

1. An animal trap comprising a body, a removable apertured cover, a spring actuated disk hinged to swing into the said trap body, arms also projecting into the body or vessel both removable with the cover, and pivoted devices carrying the bait supported by said arms and adapted to be held in an operative position by the spring action of said disk when the trap is set.

2. An animal trap comprising a body, a removable apertured cover, a spring actuated disk hinged to swing into the said trap body, arms also projecting into the body or vessel, an arch bar pivoted to said arms, a bait bar and a shoulder connected therewith, the bait bar carrying the bait on its free end and the shoulder serving to receive the free end of said disk.

3. An animal trap comprising a body, a removable apertured cover, a spring actuated disk having an aperture filled with fine wire gauze hinged to swing into the said trap body, arms also projecting into the body or vessel and pivoted devices supported thereby and carrying the bait at one end and adapted to be held in an operative position at the other end by the spring action of the said disk when the trap is set.

4. An animal trap comprising a body, a removable apertured cover, a spring actuated disk having an aperture filled with fine wire gauze hinged to swing into the said trap body, arms also projecting into the body or vessel, an arch bar pivoted to said arms, a bait bar and a shoulder connected therewith, the bait bar carrying the bait on its free end and the shoulder on its opposite end serving to receive the free end of said disk.

5. An animal trap comprising a cylindrical body of transparent material such as glass closed at one end and having a screw threaded neck at the other end, a removable screw threaded cover apertured, a disk closing the aperture in the cover and having a spring actuated hinge and opening inwardly into the body of the transparent vessel, arms projecting into said vessel and devices pivotally connected to said arms and adapted to support the bait at one end and to be held at the opposite end in a set position by the free edge of said disk under the tension of the spring hinge.

6. An animal trap comprising a cylindrical body of transparent material such as glass closed at one end and having a screw threaded neck at the other end, a removable screw threaded cover apertured, a disk closing the aperture in the cover and having a spring actuated hinge and opening inwardly into the body portion of the transparent vessel, arms projecting into said vessel, an arch bar pivoted to the free ends of the arms, a bait bar and shoulder connected to the arch bar, the bait bar at its free end adapted to carry the bait and the shoulder to receive the free edge of the disk and the parts to be held as set by the spring action of the hinge of the disk.

7. An animal trap comprising a cylindrical body of transparent material such as glass, having a concavo-convex end silvered to simulate a mirror, and having a screw threaded neck at the other end, a removable screw threaded cover apertured, a disk closing the aperture in the cover and having a spring actuated hinge and opening inwardly into the body of the transparent vessel, arms projecting into said vessel and devices pivotally connected to said arms and adapted to support the bait at one end and to be held in a set position at the other end by the free edge of said disk under the tension of the spring hinge.

8. An animal trap comprising a cylindrical body of transparent material such as glass, having a concavo-convex end silvered to simulate a mirror and having a screw threaded neck at the other end, a removable screw threaded cover apertured, a disk closing the aperture in the cover and having a spring actuated hinge and opening inwardly into the body of the transparent vessel, arms projecting into said vessel, an arch bar pivoted to the free ends of the arms, a bait bar and shoulder connected to the arch bar, the bait bar at its free end adapted to carry the bait and the shoulder to receive the free edge of the disk and the parts to be held as set by the spring action of the hinge of the disk.

9. An animal trap comprising a body, a removable apertured cover, a spring actuated disk hinged to the inner surface of the cover, arms connected to the cover and projecting into the body or vessel, and pivoted devices supported by the arms and carrying the bait and adapted to be held in an operative position by the spring action of said disk when the trap is set.

10. An animal trap comprising a body, a removable apertured cover, a part coming between the cover and the end of the body to which the cover is secured and apertured to correspond with the cover, a spring hinge actuated disk opening into the body, arms projecting into the body or vessel and devices pivoted to the arms and carrying the bait and adapted to be held in an operative position by the spring action of the disk, when the trap is set.

Signed by me this 4th day of August, 1908.

OTTO KÄMPFE.

Witnesses:
ARTHUR H. SERRELL,
E. ZACHARIASEN.